UNITED STATES PATENT OFFICE

EUGENE L. CHAPPELL, OF PITTSBURGH, PENNSYLVANIA, ASSIGNOR TO NATIONAL TUBE COMPANY, A CORPORATION OF NEW JERSEY

LOW-SOLUBLE CEMENT

No Drawing.   Application filed October 27, 1931. Serial No. 571,455.

This invention relates to cements and cement lined pipes, one of the objects being to produce a cement of low solubility, that is capable of application to the interior of a pipe to form a homogeneous coating. Another object is to provide a pipe having a low-soluble cement lining or coating.

In detail, the invention is a cement consisting of Portland cement and cupola slag, the cement preferably comprising about 33 per cent. and the slag about 66 per cent. of the mixture. This mixture is ground to have a maximum fineness of a 15 per cent. deposit on a two hundred mesh sieve. This degree of fineness will produce a cement of sufficiently low solubility for use in lining pipes. It is not, however, sufficiently sticky to certainly adhere to a vertical pipe's interior when blown or sucked therethrough.

By grinding the previously described mixture so fine that only 20 per cent. of it has a diameter greater than 22 microns, it is impossible to grade this small degree of fineness by reference to the standard 200 mesh sieve test, the cement is sufficiently sticky to adhere to the pipe even though in a vertical position.

The cement, when ground to the first named fineness, may be used to coat pipes in the mill where they may be positioned horizontally and, when ground to the second named fineness, the cement is suitable for coating pipes already installed in buildings by being blown or sucked therethrough as suggested.

Now it must be thoroughly understood that cupola slag and blast furnace slag, the latter being frequently used in cement manufacture, are entirely different. Cupola slag is produced in such small amounts by even large steel plants that it is ordinarily considered impractical to use it in cement manufacture. Cement for the use for which the present one is intended need not, however, be manufactured in excessively large quantities, and the use of cupola slag consequently becomes practical.

The chemical constituents of typical cupola slag are substantially as follows:

| | Per cent |
|---|---|
| Calcium oxid | 23 –30 |
| Magnesium oxid | .7– 2 |
| Ferric oxid | 4 –16 |
| Aluminum oxid | 6 –12 |
| Silica | 45 –54 |

Typical blast furnace slags have a much greater percentage of calcium oxid and a much lower percentage of silica and ferric oxid than do cupola slags.

Although a specific example of the invention has been disclosed in accordance with the patent statutes, it is not intended to limit its scope exactly thereto, except as defined by the appended claims.

I claim:

A low soluble cement consisting of a mixture of substantially 33 per cent. Portland cement and 66 per cent. cupola slag, said slag substantially consisting of from 23 to 30 per cent. calcium oxid, 4 to 16 per cent. ferric oxid, 6 to 12 per cent. aluminum oxid and 45 to 54 per cent. silica.

In testimony whereof, I have hereunto set my hand.

EUGENE L. CHAPPELL.